United States Patent
Böhmler

(10) Patent No.: US 6,564,895 B1
(45) Date of Patent: May 20, 2003

(54) BELT RETRACTOR FOR A VEHICLE SAFETY BELT AND METHOD FOR ACTUATING THE BELT RETRACTOR

(75) Inventor: Klaus Böhmler, Schwäbisch Gmünd (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/455,205

(22) Filed: Dec. 6, 1999

(30) Foreign Application Priority Data

Dec. 7, 1998 (DE) .......................... 198 56 364

(51) Int. Cl.$^7$ ............................................ B60R 21/00
(52) U.S. Cl. ...................... 180/269; 280/806; 280/807; 297/470
(58) Field of Search ................ 180/268, 269; 280/807, 806; 242/379.1; 297/470

(56) References Cited

U.S. PATENT DOCUMENTS

| | | | | |
|---|---|---|---|---|
| 3,767,134 A | * | 10/1973 | Morales ..................... 180/268 |
| 3,797,603 A | * | 3/1974 | Loomba ................. 280/807 X |
| 4,600,164 A | * | 7/1986 | Ty et al. ................ 280/807 X |
| 4,688,825 A | * | 8/1987 | Arbogast et al. ........ 180/286 X |
| 4,817,754 A | * | 4/1989 | Muramoto ............. 180/268 X |
| 4,848,795 A | * | 7/1989 | Muraishi et al. ........ 280/807 X |
| 4,858,953 A | * | 8/1989 | Nishimura et al. ......... 180/268 |
| 4,976,474 A | * | 12/1990 | Doty et al. ............. 280/807 X |
| 5,002,236 A | * | 3/1991 | Cotter .................... 280/807 X |
| 5,193,760 A | * | 3/1993 | Fujimura et al. ........ 280/807 X |
| 5,224,736 A | * | 7/1993 | Sedlmayr et al. ............ 280/807 |
| 5,289,987 A | * | 3/1994 | Collins et al. .......... 280/807 X |
| 5,292,153 A | * | 3/1994 | Mishina ....................... 280/807 |
| 5,820,058 A | * | 10/1998 | Hirzel et al. ............. 242/379.1 |
| 5,924,641 A | * | 7/1999 | Keller et al. ............ 280/806 X |
| 5,931,402 A | * | 8/1999 | Weller .................... 280/807 X |
| 5,934,596 A | * | 8/1999 | Gorman et al. .......... 242/379.1 |
| 5,954,287 A | * | 9/1999 | Hirase ..................... 242/379.1 |
| 5,961,060 A | * | 10/1999 | Brambilla et al. ....... 242/379.1 |
| 5,967,442 A | * | 10/1999 | Wier ....................... 242/379.1 |
| 5,984,223 A | * | 11/1999 | Hiramatsu .................. 242/374 |
| 6,012,667 A | * | 1/2000 | Clancy et all. .......... 242/379.1 |
| 6,216,972 B1 | * | 4/2001 | Rohrle ................... 280/806 X |

FOREIGN PATENT DOCUMENTS

| | | | | |
|---|---|---|---|---|
| DE | 2602875 | * | 1/1976 | ................. 280/807 |
| DE | 19650494 | | 6/1998 | |
| DE | 19727919 | | 11/1998 | |
| DE | 29816280 | | 3/1999 | |
| EP | 0123410 | * | 10/1984 | ............. 280/807 X |
| EP | 0124633 | * | 11/1984 | ............. 280/807 X |
| GB | 2112628 | * | 7/1983 | ............. 280/807 X |
| GB | 002265076 | * | 9/1993 | ............. 280/807 X |

OTHER PUBLICATIONS

U.S. patent application Ser. No. 09/382,919 filed Aug. 25, 1999.

* cited by examiner

*Primary Examiner*—Paul N. Dickson
*Assistant Examiner*—Toan To
(74) *Attorney, Agent, or Firm*—Tarolli, Sundheim, Covell & Tummino L.L.P.

(57) ABSTRACT

A belt retractor for a vehicle safety belt comprises a belt spool, at least one locking member which at least largely prevents a belt spool rotation in the case of restraint, and a force limiter. The force limiter opposes a defined force to a rotation of the belt spool on unwinding of the safety belt. Furthermore, a blocking mechanism and an adjusting element for the blocking mechanism are provided. The blocking mechanism is able to be moved by the adjusting element at least partially toward a blocking position. In the blocking position, the blocking mechanism deactivates the force limiter. After a primary impact, a non-used force limiter is force transmitting, or the force limiter or force limiters are deactivated.

11 Claims, 2 Drawing Sheets

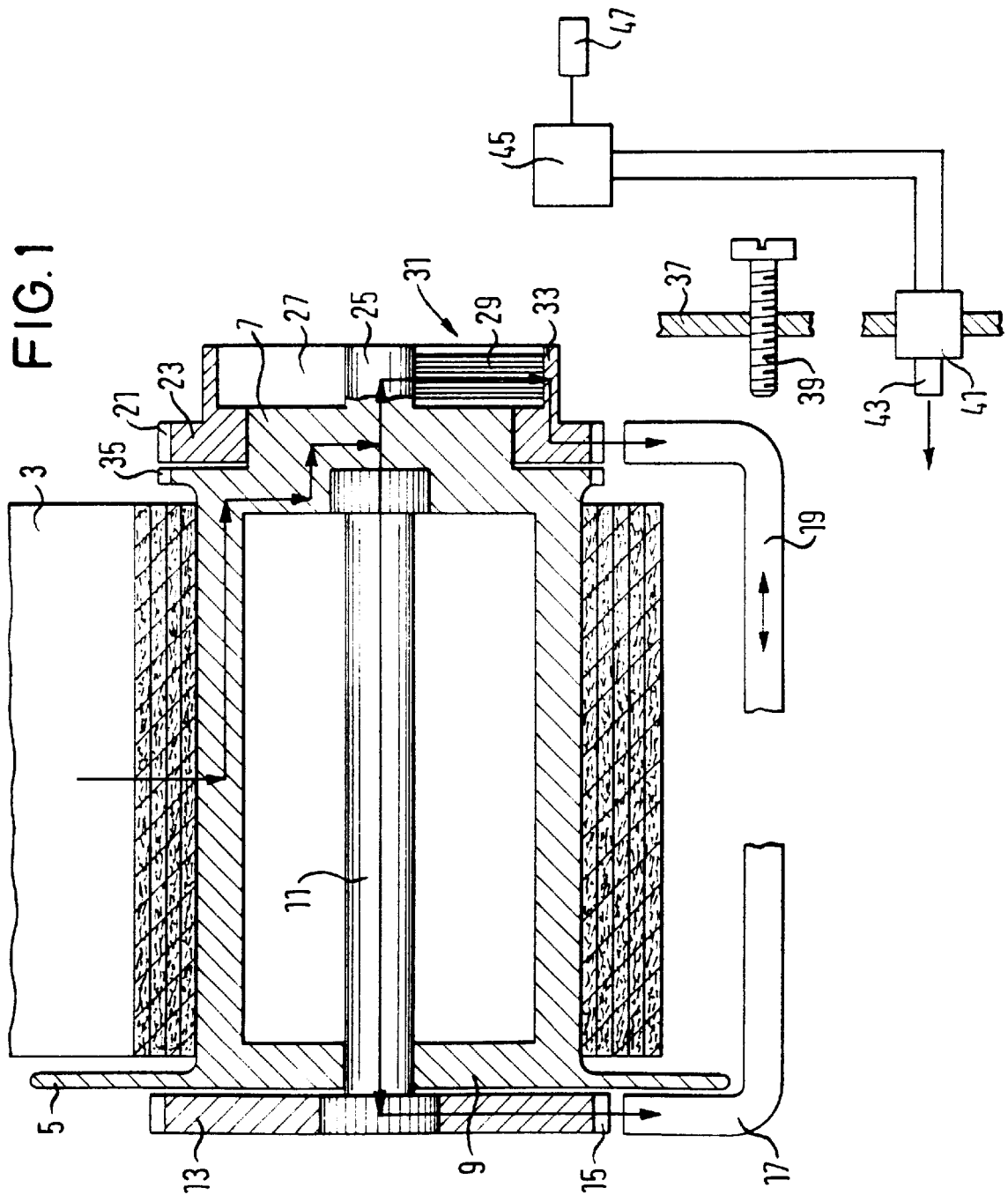

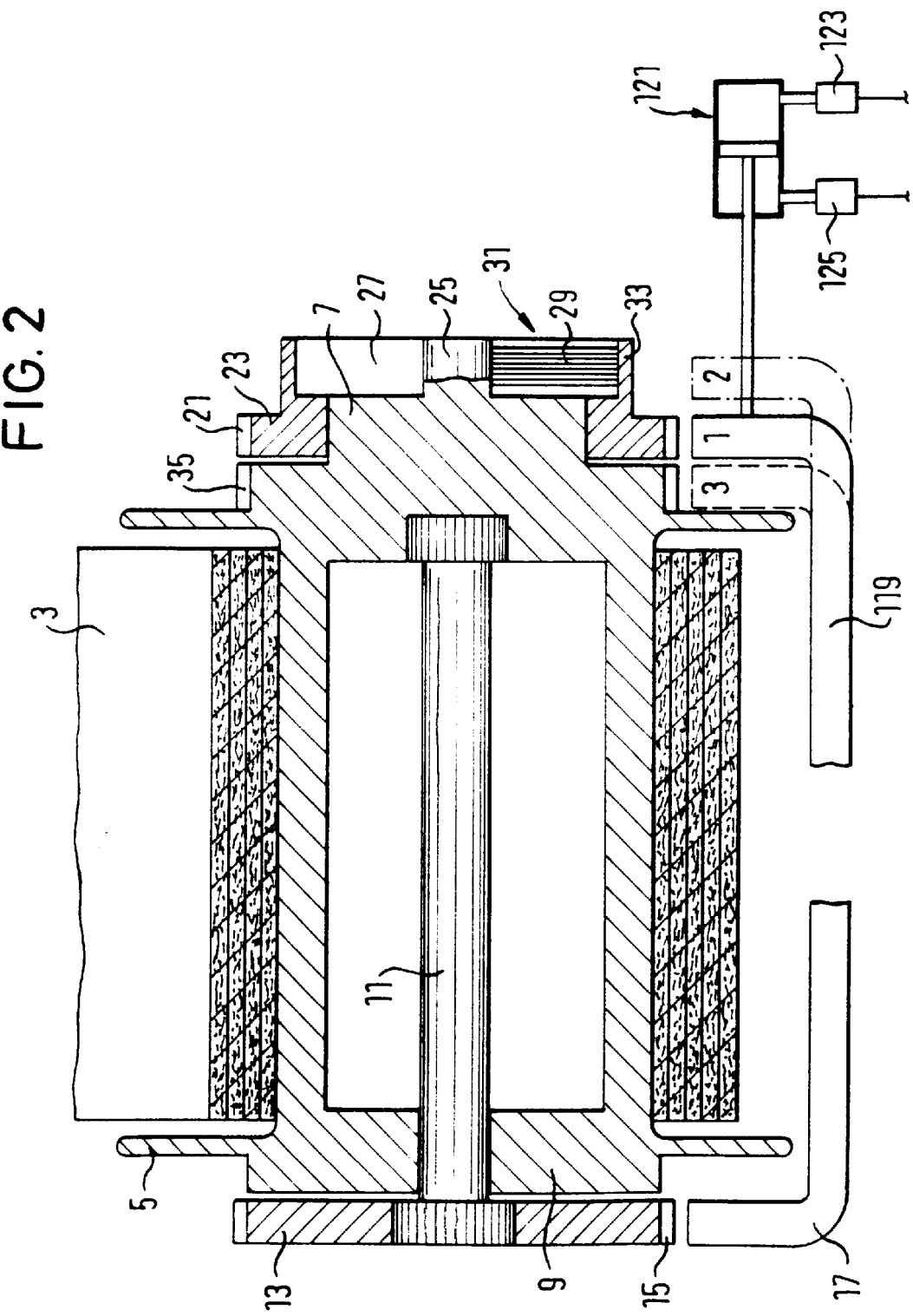

BELT RETRACTOR FOR A VEHICLE SAFETY BELT AND METHOD FOR ACTUATING THE BELT RETRACTOR

TECHNICAL FIELD

The invention relates to a belt retractor for a vehicle safety belt and a method for actuating a belt retractor.

BACKGROUND OF THE INVENTION

Known belt retractors comprise a belt spool, at least one locking member which at least largely prevents a belt spool rotation in the case of restraint, and a force limiter which opposes a defined force to a rotation of the belt spool on unwinding. Force limiters (e.g. torsion rods, band extraction devices or deformable threads) are intended to limit the restraining force exerted onto the occupant via the safety belt in an accident. However, the limiting of the force is also disadvantageous in particular situations. For example, extremely heavy occupants can experience a restraining force which is too small through the force limiter which is designed too weak for them. Furthermore, the force limiters are generally coordinated with the gas bag which is additionally present in the vehicle, i.e the two safety systems only develop the optimum restraining effect together. If the gas bag is deactivated, then the restraining effect of the safety belt can be too small. This deactivation of the gas bag is possible for example in the USA on request. Furthermore, a gas bag is of course also deactivated after it has been triggered. After a so-called primary impact, it is therefore no longer available to support the safety belt system. Furthermore, after a primary impact the force limiter is partially destroyed, because force limiters usually consist of plastically deformable elements. Therefore, a smaller restraining effect is available after the primary impact for a second restraint, although a higher restraining effect should be present, because the gas bag is out of operation.

BRIEF SUMMARY OF THE INVENTION

The invention provides a belt retractor which eliminates the above-mentioned disadvantages. The belt retractor according to the invention comprises a belt spool, at least one locking member which at least largely prevents a belt spool rotation in the case of restraint, and a force limiter which opposes a defined force to the rotation of the belt spool on unwinding. Further, a blocking mechanism and an adjusting element for the blocking mechanism are provided. The blocking mechanism can be moved by the adjusting element toward or into a blocking position. In the blocking position, the force limiter is deactivated. This means that the force limiter is bridged with respect to the path of the flux of force and an immediate locking of the belt spool is achieved without the detour via the force limiter. The force limiter, although being bridged, does not have to be completely excluded from the path of the flux of force. Rather, it is also possible for two paths of flux of force to be present in the locking position: a direct one from the belt spool to a blocking member without intercalation of a force limiter, and an indirect one via the force limiter. The term "at least partially toward another position" which is also frequently used hereinbelow means that the adjusting element actuates the blocking mechanism to such an extent that it is brought into the blocking position in a belt webbing-sensitive or vehicle-sensitive manner in the case of restraint. However, this technical expression is also intended to cover the fact that the adjusting element brings the blocking mechanism directly into the blocking position, which can also be a switching under load if, in fact, for example after a primary impact, after a force limiter has acted, the blocking mechanism is moved immediately into the blocking position for the complete locking of the belt spool.

Preferably, in addition the blocking mechanism has a release position in which it does not influence the belt spool rotation. The force limiter therefore acts in this position. If several force limiters are provided, in the release position for example all force limiters can be connected.

According to a development, several force limiters are provided. The blocking mechanism has a further position in which it connects a force limiter. This means that at least three different restraining forces can be achieved. The highest restraining force is provided in the blocking position, a further restraining force on connecting the force limiter becoming active in the further position, and finally a third restraining force when the blocking mechanism is neither in the blocking position nor in the further position (i.e. for example in the release position), so that here only the deactivatable force limiter is in action.

According to the preferred embodiment, the adjusting element is designed such that after a primary impact it brings the blocking mechanism at least partially toward the blocking position. This offers a good restraining effect both in the case of a secondary forward movement of the occupant and also in the case of a subsequent impact (multiple collision or second accident after primary impact).

The position of the blocking mechanism depends on at least one of the following factors:

weight of the occupant, height of the occupant, severity of the accident or position of the occupant in the vehicle.

The latter point should make the so-called out-off-position situation controllable, when the occupant in fact is not sitting centrally and leaning back in the vehicle, but rather has moved from this ideal position before the accident.

According to a development, the adjusting element can be moved manually by an operator and the blocking mechanism can thereby be brought at least partially toward the blocking position. Preferably, the adjusting element here is an adjusting screw. This has the purpose of likewise deactivating the force limiter, e.g. with a deactivated gas bag, so that it can provide a higher restraining force. Also, if for example a very heavy person continually uses the vehicle, the force limiter can be deactivated.

The adjusting element can also be an electric adjusting element, such as a switch for example. This electric adjusting element can be connected with a switch, with a sensor arrangement or for example also with the gas bag control, so that automatically on deactivation of the gas bag, the blocking mechanism is also brought toward the blocking position.

Furthermore, it is also possible to achieve an automatic movement of the adjusting element in a purely mechanical manner. Here, the adjusting element is coupled mechanically with the belt spool. In the case of restraint, when belt webbing is unwound under load, the belt spool rotation leads to such a movement of the adjusting element that the blocking mechanism is shortly before the blocking position. This can be achieved for example in that the adjusting element is a clutch disc which on acceleration in the case of restraint moves a control catch as blocking mechanism toward the blocking position. Furthermore, it is also possible in the case of restraint to couple the belt spool with a nut/spindle arrangement, whereby the spindle is set into rotation and the nut, which is not co-rotating, is displaced axially. The nut can then serve as adjusting element. A further possibility for mechanical coupling consists for example in the provision of an oblique plane or a crank which in the case of restraint are set in rotation, in order to divert an adjusting movement.

Furthermore, the adjusting element can also be constructed as a pyrotechnical adjusting drive. The blocking mechanism preferably comprises a blocking member in the form of a displaceable locking catch. The locking catch engages in the locking position into a locking toothing associated with the belt spool, hereinafter named the belt spool locking toothing. If several force limiters are provided, the blocking mechanism has a further position, in which it connects a force limiter. In each case the force limiters have a separate locking toothing associated with them. The displaceable locking catch engages in the further position into a locking toothing of a further force limiter. Thereby, this force limiter is connected for example when a heavy occupant is present or if there is a serious accident.

A band extraction device or a torsion rod for example come into consideration as force limiters. Each force limiter can have its own locking toothing associated with it and its own locking catch or the displaceable locking catch.

The present invention relates in addition to a method for actuating a belt retractor comprising a belt spool, at least one locking member which at least largely prevents a belt spool rotation in the case of restraint, a force limiter which opposes a defined force to a rotation of the belt spool on unwinding of said safety belt, a blocking mechanism, an adjusting element for the blocking mechanism and comprising several force limiters, the adjusting element being designed such that, by actuation of the adjusting element after a primary impact, an other force limiter is force transmitting.

According to a further method the force limiter is deactivated by actuating the blocking arrangement after a primary impact. If several force limiters are present, then all of them are deactivated. As the force limiter acting during the primary impact is usually plastically deformed, a restraining effect can again be achieved by the belt retractor, e.g. for a secondary impact. The idea of bringing an other limiter in a force transmitting path is not limited to a retractor having force limiters of which can be deactivated.

BRIEF DESCRIPTION OF THE DRAWINGS

FIG. 1 shows a longitudinal section through a belt retractor according to the invention in accordance with a first embodiment, with a manually actuatable adjusting element and with an electric adjusting element, and FIG. 2 shows a longitudinal section through a belt retractor according to a second embodiment, with pyrotechnic adjusting drive.

DETAILED DESCRIPTION OF PREFERRED EMBODIMENTS

In FIG. 1, a belt retractor is illustrated for a vehicle safety belt 3. The safety belt is wound onto a belt spool 5. The belt spool 5 has two end walls, namely a right-hand end wall 7 and a left-hand end wall 9. A torsion rod 11 extends through the interior of the belt spool 5, which is connected non-rotatably with the right-hand end wall 7. The torsion rod 11 extends through an opening in the left-hand end wall 9 towards the exterior and is connected with a blocking wheel 13, which has a locking toothing 15 on its outer periphery. With an abrupt unwinding of the belt in the case of restraint, a locking member in the form of a pivoted locking catch 17 can move into the locking toothing 15, so that the locking wheel 13 is prevented from rotating. Mechanisms for actuating the locking catch 17 are known and are already described in earlier applications, so that they do not have to be entered into in further detail here. Usually, locking catches are sheet metal pieces bent in a U-shape, which have locking teeth on their free shank ends. The locking catch 17 can be envisaged as one half of such a piece bent in a U-shape. Furthermore, the belt retractor has an additional locking catch, as it were the right-hand-half of a conventional locking catch bent in a U-shape. This right-hand locking catch is designated by 19.

Whereas the left-hand locking catch is only pivoted, the right-hand locking catch 19 is pivoted and in addition is displaceable in the arrow direction. The locking catch 19 also represents a locking member. Its locking teeth can engage with a locking toothing 21 on the outer face of a housing 23, when the locking catch 19 is in the position illustrated in FIG. 1. The housing 23 surrounds the right-hand end wall 7. Between a pin-shaped extension of the end wall 7, which is designated by 25, and the housing 23, there is a space 27 in which a metal band 29 is accommodated as part of a band extraction device 31 in a channel. This band extraction device 31, in addition to the torsion rod 11, forms a second force limiter in the belt retractor. The band extraction device has a so-called guideway 33. In the case of restraint, the metal band 29 is drawn under load through the guideway 33 and deformed owing to the unwinding of the belt webbing. The force necessary for this is opposed to the rotation of the belt spool under load, i.e., in the case of restraint.

The locking catch 19 is displaceable towards the left and can be moved to a belt spool locking toothing 35. The belt spool locking toothing 35 is distinguished by no force limiter being arranged between it and the belt spool 5. The locking catch 19 forms a blocking mechanism.

In a housing 37 surrounding the belt spool, which housing is only illustrated by a section, an adjusting screw 39 is provided, which serves as adjusting element. The adjusting screw 39 can be turned into the threaded opening associated with it in the housing 37 to such an extent that its point strikes against the locking catch 19. By means of the screw, which can also be coupled to the locking catch 19 in both axial directions, the locking catch 19 can be moved to the left and can come to lie beneath the spool locking toothing 35 and, on pivoting, can engage on this toothing 35. When the locking catch 19 is engaged into the spool locking toothing 35, the blocking mechanism is in the blocking position. If, on the other hand, the locking catch 19 is in the position shown in FIG. 1 and in addition also comes into engagement with the locking toothing 21, a so-called further position of the blocking mechanism is achieved. As mentioned, it is also conceivable to move the locking catch 19 from the further position directly into the blocking position which, however, requires a design of the adjusting element and of the toothing which is coordinated therewith.

In normal driving operation, the safety belt 3 can be unwound from the belt spool 5 and can be retracted again by it. Here, the belt retractor according to the invention operates like the known belt retractors. In the case of restraint, for example with a sudden unwinding of belt webbing, the two locking catches 17 and 19 which are not coupled with each other come into engagement with their associated locking toothing. When the locking catch 17 comes into engagement with the locking toothing 15, the torsion rod 11 is prevented from rotation at its left-hand end. However, in the case of restraint, force is exerted onto the safety belt 3 by the occupant moving forward, so that the belt spool 5 twists the torsion rod between its two axial ends and possibly even plastically deforms it.

When the locking catch 19 is in the position shown in FIG. 1 and is coupled with the locking toothing 21 likewise in the case of restraint (further position), the band extraction device 31 is also activated. Thereby, via the rotating right-hand end wall or another disc coupled with it, the metal band 29 is drawn through the guideway 33. Hereby also a resistance is offered to the rotation of the belt spool 5. Hence, both force limiters are active. The path of force is represented by the arrows. Both force limiters are connected in parallel. If the safety belt is always used by an extremely heavy occupant or if the associated gas bag is deactivated at the request of the vehicle user, then the adjusting screw 39 is actuated by an operator in a specialist workshop, and the locking catch 19 is moved towards the left. In the case of restraint, it blocks the belt spool 5 via the belt spool locking toothing 35. This means that a force limiter is no longer in action, which opposes only a limited force to a rotation of the belt spool 5 under load and permits a rotation of the belt spool to a limited extent. The restraining force is thereby greater. Also in this case, the locking catch 17 engages into the locking toothing 15, although the torsion rod 19 is deactivated or bridged, by a direct flux of force being provided from the belt spool into the locking catch 19 without the intercalation of a force limiter. However, it is advantageous that in this case the locking catch 17 also engages into the locking toothing 15, so that the belt spool 5 is not supported on one side only at its right-hand axial end. Thus, the locking catch 17, although as good as no more force flows through it, services for stabilizing the belt spool 5 in the case of restraint. Of course, a certain slight force can also still be directed via the torsion rod 11 to the locking catch 17. However, in the sense of the invention, this means that nevertheless the torsion rod 11 is deactivated as force limiter, because a direct flux of force from the belt spool 5 to the locking catch 19 is present without intercalation of a force limiter.

Instead of an adjusting screw 39, an electric adjusting element 41 can also be provided, as is illustrated in FIG. 1. The electric locking element 41 has a type of switching striker 43 which can engage on the locking catch 19 or is even connected with it. The electric adjusting element 41 is coupled with a control 45 which can be the gas bag control, for example. This control 45 is connected with a plurality of sensors 47, only one of which is shown. This arrangement provides numerous possibilities for actuating the belt retractor. When the gas bag, more precisely the gas bag restraint device, is deactivated, the control 45 gives corresponding signals to the adjusting element 41. This then displaces the locking catch 19 to the left. In addition, for example the sensors can be constructed as sensors determining the weight of the occupant, the height of the occupant, the severity of the accident or the position of the occupant in the vehicle. If the occupant is particularly heavy, for example, automatically the locking catch 19 is pushed to the left, if the occupant is light or has an average weight, the adjusting element 41 leaves the locking catch 19 in the position shown in FIG. 1 or pushes it back to it. Also in the case of accidents of extreme severity, which is determined by a so-called crash sensor, it can occur that the adjusting element 41 pushes the locking catch 19 to the left and hence permits the blocking position.

However, the arrangement which is shown is able to do still more. For example, the adjusting element can bring the locking catch 19, after a primary impact in which the torsion rod 11 has acted, toward or even directly into the blocking position or can bring a non-used force limiter into a force transmitting path, so that sufficient restraining force would still be available for a secondary impact or in the case of a further impact on the journey, e.g. to a workshop.

The embodiment shown in FIG. 1 corresponds in most parts to the embodiment illustrated in FIG. 1, so that the parts already mentioned and corresponding to each other also bear the reference numbers already given and these no longer have to be entered into in further detail. However, the belt retractor differs from the one shown in FIG. 1 in the blocking mechanism. The locking catch 119 can be moved parallel to the torsion rod 11, i.e. in axial direction, into three positions. For the displacement, a pyrotechnic adjusting drive 121 is provided in the form of a double-acting cylinder, the working spaces of which have their own gas generator 123, 125. Each gas generator 123, 125 is connected with a control unit which corresponds to the one designated by 45 in FIG. 1. The three different positions of the locking catch 119 are:

The position designated by 1 and described in connection with FIG. 1, from which the locking catch 119 can swivel into the locking toothing 21 and hence the further position.

The so-called release position designated by 2, in which the locking catch can not engage in any locking toothing, even in an accident.

The position designated by 3, from which the locking catch 119 can pivot into the belt spool locking toothing 35 and thus the blocking position.

If, for example, the position 1 designates the normal driving operation the locking catch 119 can be moved by the pyrotechnical adjusting element 121 both to the right and also to the left. If, for example, a particularly light person is to be restrained, it can be necessary to move the locking catch into the position 2, the release position. Furthermore, it is also conceivable that after a primary impact the locking catch 119 is moved into the position 3, where it deactivates all the force limiters. However, the release position 2 can also serve as starting position. Then, the pyrotechnic adjusting drive 121 merely has to be constructed differently, namely as a cylinder which has two different stroke lengths in one direction. In this case, according to conditions, the locking catch can be moved into the position 1 or 3.

The method according to the invention makes provision that after a primary impact, the force limiters (torsion rod and band extraction device) are deactivated, in order to arrive at a higher restraining force. The previously described belt retractor, however, as also described, does not have to be actuated compulsorily for the method according to the invention, but also offers other possibilities of achieving different restraining forces.

What is claimed is:

1. Apparatus for restraining a vehicle occupant comprising:

a safety belt adapted to at least partially extend around the vehicle occupant, a belt spool on which said safety belt is wound and being rotatable in a belt unwinding direction and in a belt winding direction;

at least one locking member which, in a first condition inhibits the belt spool rotation in the unwinding direction to restrain the vehicle occupant who applies a force against said safety belt below a predetermined force and in a second condition prevents rotation of said belt spool in the unwinding direction regardless of whether a force is applied which is above or below the predetermined force, a mechanism which resists but also allows a controlled rotation of said belt spool in the direction of unwinding of said safety belt when a force above said predetermined force is applied to said belt spool and when said locking member is in said first condition, and an adjusting element for moving said locking member between said first and second conditions.

2. The belt retractor according to claim 1, wherein said locking member has a release position in which it does not influence belt spool rotation.

3. The belt retractor according to claim 1, wherein another locking member is provided and another mechanism is provided, said another locking member, when in a third condition, inhibiting the belt spool rotation in the unwinding direction to restrain the vehicle occupant who applies a force against said safety belt below the predetermined force, said another mechanism resists but also allows a controlled rotation of said belt spool in the direction of unwinding of said safety belt when a force above said predetermined force is applied to said belt spool and when said another locking member is in said third condition.

4. The belt retractor according to claim 3, wherein said locking member is in said first condition simultaneously when said another locking member is in said third condition, both of said mechanisms simultaneously resisting but also allowing a controlled rotation of said belt spool in the direction of unwinding of said safety belt when a force above said predetermined force is applied to said belt spool.

5. The belt retractor according to claim 3, wherein said another mechanism is constructed as a torsion rod separate from said belt spool.

6. The belt retractor according to claim 1, wherein said adjusting element moves said locking member to said first condition upon the occurrence of a first vehicle impact and said adjusting element moves said locking member from said first condition to said second condition upon the occurrence of a second vehicle impact after said first vehicle impact.

7. The belt retractor according to claim 6 wherein the adjusting element is an adjusting screw.

8. The belt retractor according to claim 6 wherein said adjusting element is a manually operated switch for actuating an electric adjusting element.

9. The belt retractor according to claim 1 wherein said adjusting element is adjusted manually by an operator and said at least one locking member is thereby moved.

10. The belt retractor according to claim 1, wherein said at least one locking member has a displaceable locking catch which in said second condition engages with a belt spool locking toothing.

11. The belt retractor according to claim 1, wherein said mechanism is constructed as a band extraction device separate from said belt spool.

* * * * *